United States Patent [19]

Place

[11] 4,408,093
[45] Oct. 4, 1983

[54] CRYPTOGRAPHIC ENCODER-DECODER

[75] Inventor: Harry Place, Ridgewood, N.J.

[73] Assignee: ITT Industries, Inc., New York, N.Y.

[21] Appl. No.: 270,694

[22] Filed: Jun. 5, 1981

[51] Int. Cl.³ .............................................. H04K 1/00
[52] U.S. Cl. .............................. 178/22.19; 178/22.09
[58] Field of Search ................ 178/22.09, 22.19, 22.17

[56] References Cited

U.S. PATENT DOCUMENTS

| | | | |
|---|---|---|---|
| 1,657,366 | 1/1928 | Belin | 178/22.17 |
| 3,639,690 | 9/1969 | Braun et al. | 178/22.19 |
| 4,058,673 | 11/1977 | Johansson | 178/22.19 |
| 4,120,030 | 10/1978 | Johnstone | 178/22.19 |
| 4,168,396 | 9/1979 | Best | 178/22.09 |
| 4,172,213 | 10/1979 | Barnes et al. | 178/22.19 |
| 4,229,817 | 10/1980 | Morgan et al. | 178/22.19 |

Primary Examiner—Sal Cangialosi

Attorney, Agent, or Firm—John T. O'Halloran; Alfred C. Hill

[57] ABSTRACT

An electronic cryptographic encoder-decoder is disclosed which performs the equivalent operations of a known simple hand-held cryptographic encoder-decoder. The electronic cryptographic encoder-decoder includes a parallel addressable, programmable read only memory receiving parallel data input from a serial to parallel converter and providing parallel data output which is converted to a serial data output by a parallel to serial converter. The memory element has stored therein a plurality of different predetermined encryption-decryption character code groups addressed by the parallel input data and controlled by a character counting arrangement including a multiplicity of multi-contact switches to establish a unique code and to select appropriate ones of the plurality of code groups as determined by the unique code to provide the parallel output data from the memory means.

33 Claims, 4 Drawing Figures

Fig. 1 (PRIOR ART)
Fig. 2 (PRIOR ART)
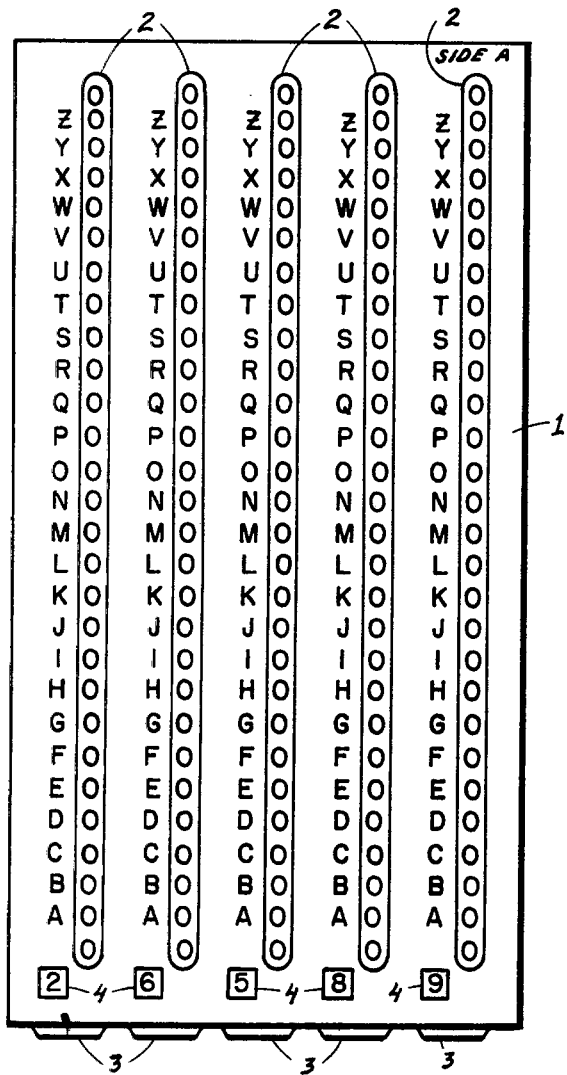
| 64 CHARACTER CODE GROUP #0 | 64 CHARACTER CODE GROUP #8 |
|---|---|
| 64 CHARACTER CODE GROUP #1 | 64 CHARACTER CODE GROUP #9 |
| 64 CHARACTER CODE GROUP #2 | NOT USED |
| 64 CHARACTER CODE GROUP #3 | NOT USED |
| 64 CHARACTER CODE GROUP #4 | NOT USED |
| 64 CHARACTER CODE GROUP #5 | NOT USED |
| 64 CHARACTER CODE GROUP #6 | NOT USED |
| 64 CHARACTER CODE GROUP #7 | NOT USED |
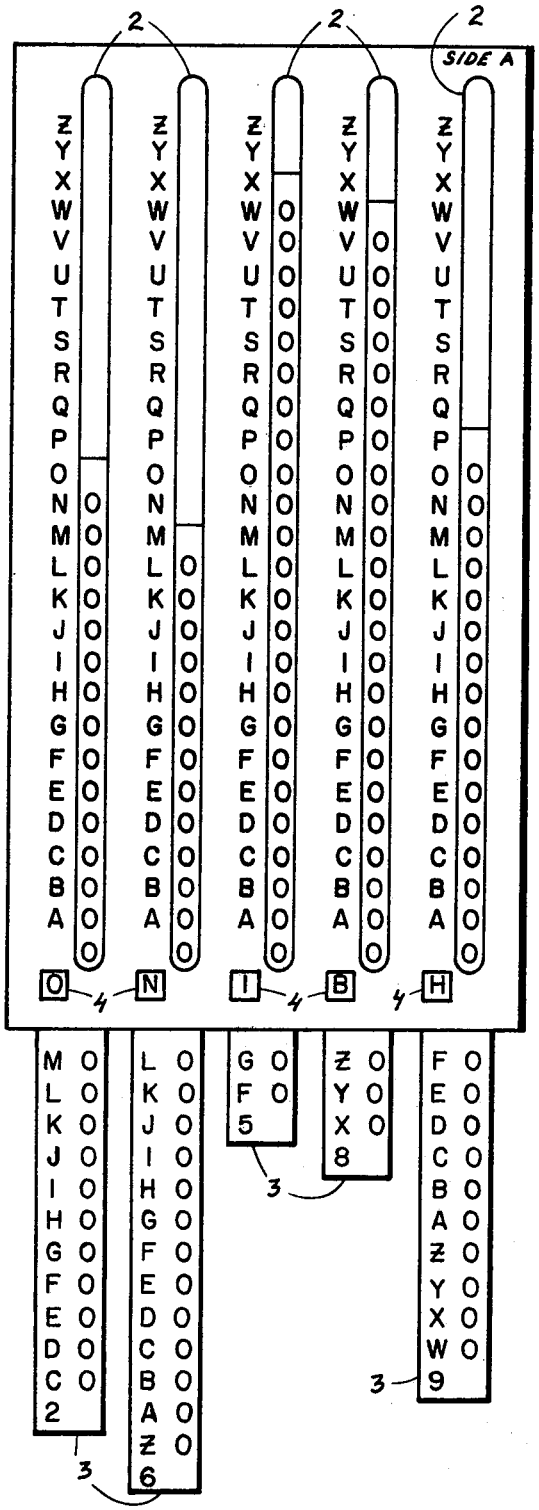
Fig. 4

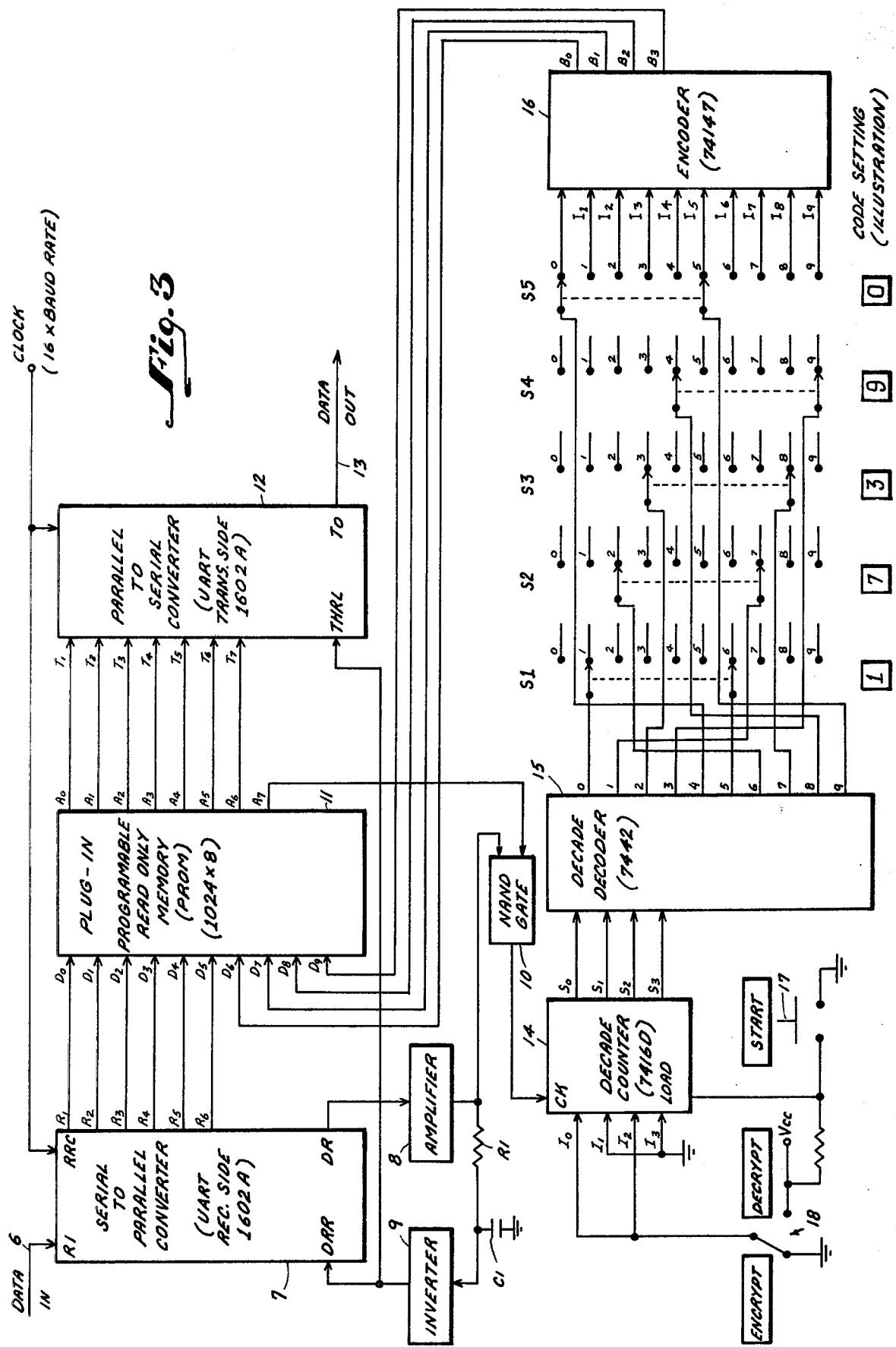

CRYPTOGRAPHIC ENCODER-DECODER

BACKGROUND OF THE INVENTION

The present invention relates to cryptographic systems and more particularly to an electronic cryptographic encoder-decoder primarily for use with commercial telephone and telegraph networks.

The increased use of telegraphic and data communications to handle financial and other sensitive data on the commercial telephone and telegraph networks has increased the risk of unauthorized disclosures. The cause is two-fold; first, just the increased traffic and, secondly, the increased exposure of this information to intelligent eavesdroppers. While many cryptographic devices have been developed for both the government and the commercial markets, the cost of such devices has been rather large.

Several years ago a simple pocket or hand-held cryptographic encoder-decoder was developed and is still in use. FIGS. 1 and 2 of the drawing illustrate this hand-held cryptographic encoder-decoder. As shown in FIG. 1, the device includes a relatively small, thin body portion 1 containing therein a plurality of slots 2, in this instant five, with the body portion 1 being capable of receiving sliders 3 registered with slots 2 and containing thereon various sequences of the characters or letters of the alphabet together with a numerical value which, when properly selected, will provide the code-of-the-day or -the-message. The code-of-the-day or -the-message 26589 is shown in the windows 4 in side A of body 1. Adjacent each of the slots 2 are letters in the normal alphabetical sequence. To encrypt a message, each letter of a word is found on body 1 adjacent one of the slots 2. A ball-point pen or other similar device is inserted into the round holes 5 of the sliders 3 and the encrypted letters will appear in windows 4 as shown in FIG. 2, wherein the word encrypted was "model." To encrypt the next word or the next five letters, the user goes to side B or the backside of the device in FIGS. 1 and 2, then back to side A and so forth alternately. The side B of the hand-held encryption device of FIGS. 1 and 2 is identical to that shown with the exception that the alphabetical sequence on the sliders 3 is the inverse of that shown. When decrypting an encrypted message by this hand-held device, the code-of-the-day is set up in windows 4 on side A and the message is decrypted by starting on side B first, then working to side A then back to side B, which process continues alternately between the two sides.

At the time the device of FIGS. 1 and 2 was developed, it was not found economical to produce an electrical encoder-decoder equivalent to the hand-held device of FIGS. 1 and 2 that would be convenient to use at a central location.

SUMMARY OF THE INVENTION

An object of the present invention is to provide a cryptographic encoder-decoder which is equivalent in operation to the hand-held device of the prior art of FIGS. 1 and 2 that is extremely simple and low cost with a foreseeable parts cost of under $100 for a half-duplex encoder-decoder.

Another object of the present invention is to provide an electronic cryptographic encoder-decoder equivalent in operation to the simple hand-held cryptographic encoder-decoder of FIGS. 1 and 2 and which may also be employed for the transmission of message traffic on-line from one teletype terminal to another.

A feature of the present invention is the provision of a cryptographic encoder-decoder comprising: a parallel addressable memory means capable of being changed storing therein a plurality of different predetermined encryption-decryption character code groups addressed by parallel input data; and first means coupled to the memory means to establish a unique code and to select appropriate ones of the plurality of code groups as determined by the unique code to provide parallel output data from the memory means.

The advent of new technology, particularly the integrated circuit technology, now makes the development of an electronic cryptographic device equivalent in operation to the simple hand-held cryptographic encoder-decoder arrangement described hereinabove with respect to FIGS. 1 and 2 simple and economical.

While the cryptographic encoder-decoder of the present invention does not offer the extensive security offered by the government-military cryptographic systems, the security offered is reasonably good, with over 3,800 code combinations when used in conjunction with the hand-held device, and over 30,000 different code combinations when used on-line between teleprinter terminals. Also fortifying security is the fact that cryptographic encoder-decoder of the present invention distributes the cryptographic exchange of characters over a span of ten characters, i.e., any given character is translated to any one of ten other characters, randomly selected. The cryptographic encoder-decoder disclosed herein is an economical electronic cryptographic encoder-decoder for the intercommunication between the hand-held cryptographic encoder-decoder users at outlying locations and major offices where communications are received, where faster handling means is required. Also, the cryptographic encoder-decoder disclosed herein provides an exceptionally simple encryption technique for point-to-point telegraphic or data communications. The on-line cryptographic encoder-decoder can be constructed with less than ten integrated circuits at a factory cost level of under $100 complete with power supply.

BRIEF DESCRIPTION OF THE DRAWING

Above-mentioned and other features and objects of this invention will become more apparent by reference to the following description taken in conjunction with the accompanying drawing, in which:

FIGS. 1 and 2 illustrate a top plan view of a known hand-held cryptographic encoder-decoder described hereinabove under the heading "Background of the Invention" showing in FIG. 1 the code-of-the-day or -message and in FIG. 2 the encrypted output for the word "model";

FIG. 3 is a block diagram of an electronic cryptographic encoder-decoder in accordance with the principles of the present invention; and FIG. 4 is a memory map used in explaining the operation of FIG. 3.

DESCRIPTION OF THE PREFERRED EMBODIMENT

It should be noted that the electronic encoder-decoder of FIG. 3 is equivalent in operation to the hand-held prior art arrangement of FIGS. 1 and 2 and may be used to operate as a system using the hand-held unit, in which case a teleprinter keyboard and printer are connected locally, where an encrypted message that is received is typed upon the keyboard and the decrypted message is printed. Alternatively, the arrangement of FIG. 3 may be used on a point-to-point telegraphic link, i.e., otherwise called on-line encryption.

Referring to FIG. 3, when used as a cryptographic encoder a plain text message is input on data input line 6 and the encrypted message is provided at output data line 13 and when used as a cryptographic decoder an encrypted message is input on data input line 6 and the plain text or decrypted message is provided at data output line 13.

The first part of the description with reference to FIG. 3 will deal with encrypting a message. As mentioned above the plain text enters at data input line 6. Note, here, that the level conversion from a typical teletype loop to logic levels is not shown, since this is readily available prior art. The incoming data on line 6 enters the receive portion 7 of a universal asynchronous receiver-transmitter module (UART). A Western Electric digital type 1602A integrated circuit is a typical unit of this type, and is used in the description of the embodiment disclosed. It should be noted, however, that other types of serial to parallel converters could be employed for receive portion 7 of the module. The incoming data on line 6 is converted from a serial format to a parallel format. Thus, an incoming telegraph character is converted from serial bits on the data input line 6 to parallel bits $R_1$-$R_6$ at the output of portion 7. The combination of driver or amplifier 8 and inverter 9, together with resistor R1 and capacitor C1 constitute a simple time delay circuit that is necessary to operate the UART in its present configuration. Thus, as each character is received, ready for presentation in parallel format, a pulse appears at the terminal DR of portion 7, is delayed for a short interval, is inverted and passed to input DRR of portion 7. This part of the circuit is necessary to provide satisfactory operation of the UART. The pulse appearing at terminal DR is also passed to NAND gate 10 through amplifier 8, which will be described later. The parallel data $R_1$-$R_6$ at the output of portion 7 is coupled to a plug-in memory element 11 in the form of a programmable read-only memory (PROM). Memory element 11 may be of the erasable type (by ultraviolet light) to permit entry of complete code changes, may be of the burn-link type, where a complete code change will require the discarding of the old memory element and the replacement with that of a new element, or a new memory element can be substituted for the memory element in the circuit, with the new memory having a complete code change therein relative to that of the memory element being replaced. Either way, the organization of the memory element 11 is $1024 \times 8$, i.e., there are 1024 binary addressable locations that will provide a unique, selectable 8-bit parallel binary word at the outputs of memory element 11. The use of memory element 11 together with an associated counting arrangement described hereinbelow constitutes the essence of the novelty of the present invention.

For the moment, assume that only data input leads $D_0$-$D_5$ to memory element 11 were addressed. If an encrypted code was placed in the first 64 locations of memory element 11, the encrypted character in digital form will appear on data output leads $A_0$-$A_6$. In other words, if the letter A in digital form were presented on data input leads $D_0$-$D_5$ the resultant output would be another letter such as X in digital form on output data leads $A_0$-$A_6$. This new character is presented to the transmit portion 12 of the UART on input leads $T_1$-$T_7$ and is converted therein to a serial format for coupling to data output line 13. Note here that there is a connection to the THRL (transmit control) terminal of unit 12 from the output of inverter 9 or the DRR terminal of the receive portion 7 of the UART. This connection is simply a necessary connection to cause the UART to transmit a character every time a character is received.

Thus, the memory element 11 can be used for simple encryption or decryption of a message, i.e., a very weak form of encryption known as the transposition technique. However, the present invention provides substantial encryption fortification by using the various memory locations available in the memory element 11 in the following way.

Addressing leads $D_6$-$D_9$ effectively divides the memory element 11 into a total of 16 separate 64 (8-bit) code groups. Thus, instead of one transposition, it is possible to have 16 separate random character transpositions, if desired. The pocket cryptographic device illustrated in FIGS. 1 and 2 actually provides 10 such independent transpositions, five on side A and five on side B of each of the sliders 3. The electrical equivalent of this is accomplished in the present invention by means of a decade counting arrangement. This arrangement includes an integrated circuit decade counter 14, i.e., a counter with a binary output that automatically resets to zero above the count of nine. The binary output of the counter 14 on output lines $S_0$-$S_3$ enters a decade decoder 15. Decoder 15 converts the binary count on lines $S_0$-$S_3$ to individual signals, each of which appears on one of ten separate output leads. These output leads are connected to five code selector switches S1-S5 as shown. Each of the switches S1-S5 include contacts identified as contacts 0-9 and each of these contacts of each of the switches S1-S5 are connected to the input lead of encoder 16 having the same identification. For instance, contact 0 of switches S1-S5 are connected to input lead $I_0$, contact 1 of switches S1-S5 are connected to input lead I, etc. Not all of the connections from the switches S1-S5 to input lines $I_0$-$I_9$ of encoder 16 are shown for clarity. Each of the switches S1-S5 also includes two poles diametrically located in the cyclic count of counter 14 so that if one of the two poles is connected to a given numbered contact, such as 3, the other of the two poles will be connected to a contact having a number five units higher, i.e., 8, such as shown with reference to switch S3. The use of the word "diametric" herein means in a cyclic count of ten, the diametric location is five, whereas in a cyclic count of sixteen, the diametric location is eight. In other words, the diametric location is one half of the cyclic count of counter 14 which cyclic count is equal to the number of character code groups stored in memory element 11. Either rotary switches or thumbwheel switches may be employed for the multi-contact switches S1-S5. The output of these switches S1-S5 goes to a binary encoder 16. Encoder 16 does the reverse of decoder 5, that is, when a single lead out of ten independent input leads is grounded, encoder 16 provides a binary code output representing the number of the grounded input lead.

Reviewing the operation of the counting arrangement, this is what occurs. When counter 14 is at position 0, the first character received, an output occurs on decoder lead 0 and is passed to switch S1. The code setting illustrated is 17390 and switch S1 is set to position 1. The zero output (first character count) of decoder 15 goes to switch S1, position 1 to encoder input lead $I_1$, which in turn is translated to binary "1" in encoder 16. This selects character code group 1 in the memory element 11 with the various groups in memory element 11 being shown in the memory map of FIG. 4. Upon the next count in counter 14, an output appears on lead 1 of decoder 15 which is coupled to position 7 of switch S2 (the code setting of switch S2) and is ultimately converted to binary count 7 in encoder 16 selecting character group 7 in the memory element 11. Continuing this, the selection of the character code groups stored in memory element 11 follows settings of switches S1–S5 as determined by the illustrated code setting. As illustrated, this will be character code groups 1, 7, 3, 9, 0 for the code setting 17390. The next five groups will be controlled by the second or diametrically located pole of each of the code switches S1–S5. Lead 5 from decoder 15 goes to contact 6 on switch S1. Following this through, the next five groups selected from the character code groups of memory element 11 will be 6, 2, 8, 4, 5. The code groups selected by the second or diametrically located pole is equivalent to using the rear side or side B of the hand-held device of FIGS. 1 and 2 when the code 17390 is set up in the windows 4 on side A of the hand-held device.

Upon starting encryption, START button of momentary contact switch 17 is depressed after first switching the ENCRYPT/DECRYPT switch 18 to the ENCRYPT position. Upon depressing the START button 17, counter 14 is set to zero. This is the equivalent of starting on side A of the hand-held device of FIGS. 1 and 2. When decryption is desired, switch 18 is set to the DECRYPT position. Depressing the START button 17 sets counter 14 to state 5 (instead of 0) and this is the equivalent of starting on side B of the hand-held device of FIGS. 1 and 2.

A few essentials regarding the programming of the memory element 11 are worth noting. Each of the first five groups of letters or characters may have separate random letter transpositions. The next five groups (representing side B of the hand-held device of FIGS. 1 and 2) must use the inverse transpositions, where group 5 is the inverse of group 0, group 6 is the inverse of group 1, group 7 is the inverse of group 2, group 8 is the inverse of group 3 and group 9 is the inverse of group 4. The inverse is defined as, for example, if group 0 is coded, A becomes F, B becomes K, then in group 5 F becomes A and K becomes B, etc. A second important point is that each character in which a transposition takes place, in addition to the transposed letter, the memory element 11 must be programmed to produce a binary "1" on the additional output lead A7 of memory element 11. The binary "1" appearing at this additional output causes counter 14 to be advanced, since this binary "1" when entering NAND gate 10, together with the data-received pulse from amplifier or driver 8, will produce a drive pulse or clock pulse to binary counter 14. Counter 14 will thus be advanced each time a letter or character that is to be coded enters memory element 11, and this will cause different random character code groups to be selected as counter 14 is advanced.

Those characters that are non-printing characters, such as carriage return, line feed, space, and perhaps punctuation are treated differently. First, the non-printing character must be repeated verbatim in all groups of the code character groups in memory element 11. Secondly, a binary "0" must be programmed into the memory element 11 for all non-printing characters so that a binary "0" appears on additional output line A7 to inhibit any advancement of counter 14.

Other points worth noting are that if it is desired to inhibit punctuation, as is the case when messages are coded into five letter groups (an International Convention established to ensure telegraph operators that unreadable messages are coded, rather than a garble resulting from telegraph transmission failure), punctuation characters may be converted into nulls.

While I have described above the principles of my invention in connection with specific apparatus, it is to be clearly understood that this description is made only by way of example and not as a limitation to the scope of my invention as set forth in the objects thereof and in the accompanying claims.

I claim:

1. A cryptographic encoder-decoder comprising:
    a parallel addressable memory means capable of being changed storing therein a plurality of different predetermined encryption-decryption character code groups addressed by parallel input data; and
    first means coupled to said memory means to establish a unique code and to select appropriate ones of said plurality of code groups as determined by said unique code to provide in response to said input data from said selected one of said plurality of code groups parallel output data from said memory means.

2. An encoder-decoder according to claim 1, further including
    second means coupled to said memory means to convert serial input data to said parallel input data for coupling to said memory means; and
    third means coupled to said memory means to convert said parallel output data from said memory means into serial output data.

3. An encoder-decoder according to claim 2, wherein a time delay means is coupled to said memory means and said second means to control the coupling of said parallel input data to said memory means.

4. An encoder-decoder according to claim 3, wherein said third means is coupled to said time delay means to ensure said third means provides a character output therefrom every time a character is received by said memory means.

5. An encoder-decoder according to claims 1, 2, 3 or 4, wherein
    said memory means is a programmable read only memory.

6. An encoder-decoder according to claim 5, wherein said read only memory is an erasable read only memory.

7. An encoder-decoder according to claim 5, wherein said read only memory is a plug-in programmable read only memory interchangeable with other plug-in programmable read only memories having said plurality of code groups changed therein in a predetermined manner.

8. An encoder-decoder according to claim 5, wherein said first means includes
    cyclic counting means coupled to an additional output of said memory means to count each character received by said memory means,
    decoding means coupled to said counter to provide an output on one of a plurality of output lines for each count of said counter, a plurality of multi-contact switch means each coupled to selected ones of said plurality of output lines, settings of said plurality of switch means establishing said unique code, and encoding means coupled to each of said plurality of switch means and said memory means to provide a binary address to select appropriate ones of said plurality of code groups as determined by said settings of said plurality of switch means.

9. An encoder-decoder according to claim 8, wherein
said counting means is a decade counter,
said decoding means is a decade decoder,
each of said plurality of switch means is a selected one of a rotary switch and a thumbwheel switch, and
said encoding means is an encoder response to a single output of said plurality of switch means to provide said binary address.

10. An encoder-decoder according to claim 8, wherein
said plurality of code groups are an even number of code groups and one half of said plurality of code groups are the inverse of the other half of said plurality of code groups.

11. An encoder-decoder according to claim 10, wherein
said counting means has a count equal to said number of said plurality of code groups.

12. An encoder-decoder according to claim 11, wherein
each of said plurality of switch means includes two poles each connected to a different one of said plurality of output lines spaced by an amount equal to one half of said count of said cyclic counter and connected to a contact of its associated one of said plurality of switch means spaced by said amount.

13. An encoder-decoder according to claim 12, wherein
said additional output of said memory means provides a first binary output to clock said counting means when said memory means receives printing characters and a second binary output to inhibit counting of said counting means when said memory means receives non-printing characters.

14. An encoder-decoder according to claim 13, wherein
said memory means is programmed to provide said first binary output at said additional output when said printing characters are received, and is programmed to have said non-printing characters repeated in each of said plurality of code groups and to provide said second binary output at said additional output when said non-printing characters are received, said non-printing characters being read out of said memory means without encryption when received thereby.

15. An encoder-decoder according to claim 14, wherein
said first binary output is a binary one and said second binary output is a binary zero.

16. An encoder-decoder according to claim 13, further including
a NAND gate having its output coupled to a clock input of said counting means, a first input coupled to said additional output of said memory means and a second input receiving a data-received pulse to clock said counting means.

17. An encoder-decoder according to claim 12, further including
a momentary contact switch coupled to said counting means, ground and a positive voltage to reset said counting means to one of two count starting points; and
a toggle switch coupled to said counting means, ground and said positive voltage to select an encrypt mode of operation when said counting means is connected to ground and to select a decrypt mode of operation when said counting means is connected to said positive voltage;
said contact switch resetting said counting means to zero when said toggle switch selects said encrypt mode of operation and resetting said counting means to one half of the count of said counting means when said toggle switch selects said decrypt mode of operation.

18. An encoder-decoder according to claim 8, further including
a NAND gate having its output to a clock input of said counting means, a first input coupled to an additional output of said memory means and a second input receiving a data-received pulse to clock said counting means.

19. An encoder-decoder according to claim 18, further including
a momentary contact switch coupled to said counting means, ground and a positive voltage to reset said counting means to one of two count starting points; and
a toggle switch coupled to said counting means, ground and said positive voltage to select an encrypt mode of operation when said counting means is connected to ground and to select a decrypt mode of operation when said counting means is connected to said positive voltage;
said contact switch resetting said counting means to zero when said toggle switch selects said encrypt mode of operation and resetting said counting means to one half of the count of said counting means when said toggle switch selects said decrypt mode of operation.

20. An encoder-decoder according to claim 8, further including
a momentary contact switch coupled to said counting means, ground and a positive voltage to reset said counting means to one of two count starting points; and
a toggle switch coupled to said counting means, ground and said positive voltage to select an encrypt mode of operation when said counting means is connected to ground and to select a decrypt mode of operation when said counting means is connected to said positive voltage;
said contact switch resetting said counting means to zero when said toggle switch selects said encrypt mode of operation and resetting said counting means to one half of the count of said counting means when said toggle switch selects said decrypt mode of operation.

21. An encoder-decoder according to claim 1 or 2, wherein
said first means includes
cyclic counting means coupled to an additional output of said memory means to count each character received by said memory means, decoding means coupled to said counter to provide an output on one of a plurality of output lines for each count of said counter, a plurality of multi-contact switch, means each coupled to selected ones of said plurality of output lines, settings of said plurality of switch means establishing said unique code, and encoding means coupled to each of said plurality of switch means and said memory means to provide a binary address to select appropriate ones of said plurality of code groups as determined by said settings of said plurality of switch means.

22. An encoder-decoder according to claim 21, wherein said counting means is a decade counter, said decoding means is a decade decoder, each of said plurality of switch means is a selected one of a rotary switch and a thumbwheel switch, and said encoding means is an encoder response to a single output of said plurality of switch means to provide said binary address.

23. An encoder-decoder according to claim 21, wherein said plurality of code groups are an even number of code groups and one half of said plurality of code groups are the inverse of the other half of said plurality of code groups.

24. An encoder-decoder according to claim 23, wherein said counting means has a count equal to said number of said plurality of code groups.

25. An encoder-decoder according to claim 24, wherein each of said plurality of switch means includes two poles each connected to a different one of said plurality of output lines spaced by an amount equal to one half of said count of said cyclic counter and connected to a contact of its associated one of said plurality of switch means spaced by said amount.

26. An encoder-decoder according to claim 25, wherein said additional output of said memory means provides a first binary output to clock said counting means when said memory means receives printing characters and a second binary output to inhibit counting of said counting means when said memory means receives non-printing characters.

27. An encoder-decoder according to claim 26, wherein said memory means is programmed to provide said first binary output at said additional output when said printing characters are received, and is programmed to have said non-printing characters repeated in each of said plurality of code groups and to provide said second binary output at said additional output when said non-printing characters are received, said non-printing characters being read out of said memory means without encryption when received thereby.

28. An encoder-decoder according to claim 27, wherein said first binary output is a binary one and said second binary output is a binary zero.

29. An encoder-decoder according to claim 26, further including a NAND gate having its output coupled to a clock input of said counting means, a first input coupled to said additional output of said memory means and a second input receiving a data-received pulse to clock said counting means.

30. An encoder-decoder according to claim 25, further including a momentary contact switch coupled to said counting means, ground and a positive voltage to reset said counting means to one of two count starting points; and a toggle switch coupled to said counting means, ground and said positive voltage to select an encrypt mode of operation when said counting means is connected to ground and to select a decrypt mode of operation when said counting means is connected to said positive voltage;

said contact switch resetting said counting means to zero when said toggle switch selects said encrypt mode of operation and resetting said counting means to one half of the count of said counting means when said toggle switch selects said decrypt mode of operation.

31. An encoder-decoder according to claim 21, further including a NAND gate having its output to a clock input of said counting means, a first input coupled to an additional output of said memory means and a second input receiving a data-received pulse to clock said counting means.

32. An encoder-decoder according to claim 31, further including a momentary contact switch coupled to said counting means, ground and a positive voltage to reset said counting means to one of two count starting points; and a toggle switch coupled to said counting means, ground and said positive voltage to select an encrypt mode of operation when said counting means is connected to ground and to select a decrypt mode of operation when said counting means is connected to said positive voltage;

said contact switch resetting said counting means to zero when said toggle switch selects said encrypt mode of operation and resetting said counting means to one half of the count of said counting means when said toggle switch selects said decrypt mode of operation.

33. An encoder-decoder according to claim 31, further including a momentary contact switch coupled to said counting means, ground and a positive voltage to reset said counting means to one of two count starting points; and a toggle switch coupled to said counting means, ground and said positive voltage to select an encrypt mode of operation when said counting means is connected to ground and to select a decrypt mode of operation when said counting means is connected to said positive voltage;

said contact switch resetting said counting means to zero when said toggle switch selects said encrypt mode of operation and resetting said counting means to one half of the count of said counting means when said toggle switch selects said decrypt mode of operation.

* * * * *